(No Model.)
F. A. OETZMANN.
DISH.
No. 433,539.                    Patented Aug. 5, 1890.
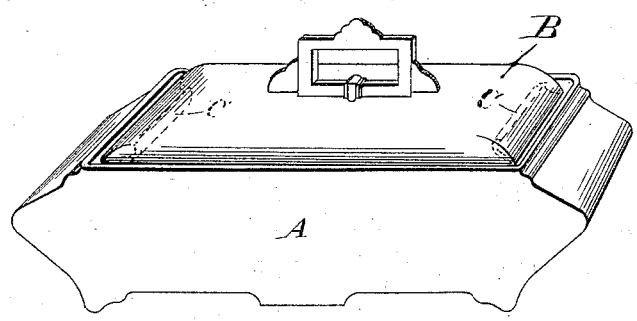
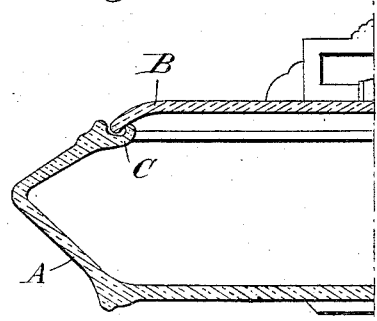 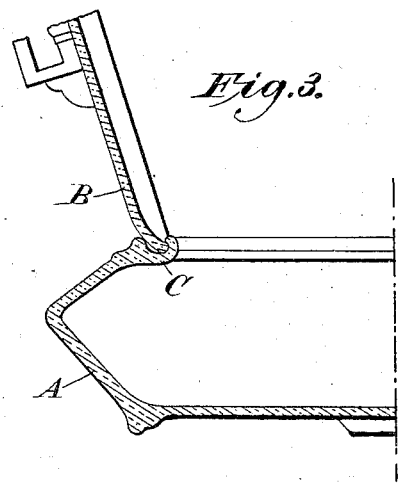
Witnesses:
Samuel John Narracott
Stephen Douglas King
Inventor:
Frederick Augustus Oetzmann

UNITED STATES PATENT OFFICE.

FREDERICK AUGUSTUS OETZMANN, OF LONDON, ENGLAND.

DISH.

SPECIFICATION forming part of Letters Patent No. 433,539, dated August 5, 1890.

Application filed September 23, 1889. Serial No. 324,865. (No model.)

*To all whom it may concern:*

Be it known that I, FREDERICK AUGUSTUS OETZMANN, a citizen of England, residing at 67 Hampstead Road, London, in the county of Middlesex, England, have invented an Improvement in Dishes and other Vessels with Covers; and I do hereby declare that the following is a full, clear, and exact description of the invention, which will enable others skilled in the art to which it appertains to make and use the same.

My invention relates to the class of dishes and other vessels having removable covers, and more especially to the covered dishes and tureens usually forming part of dinner-services, &c., and is intended to give these dishes the advantages of a hinge-jointed cover, while retaining every facility for the easy and entire removal of the cover for purposes of cleaning, &c.

It comprises a lid fitting onto a flanged rim of a special shape. When the lid is closed, it rests on the rim; but when it is required to be raised for use, instead of having to be entirely removed and either kept in the hand or placed on the table, it is simply turned backward by raising one end only. This action causes the opposite end of the lid to engage with the flanged portion of the rim, which forms part of the body of the dish or vessel, and, becoming interlocked with this, it is thereby supported in an elevated position. The fact of the cover being thus self-supporting, not only economizes space on the table, but gives freedom to both hands.

Figure 1 is a perspective view of a dish A and lid B. The flanges with which the lid interlocks when one end is raised are shown at C. Fig. 2 is a longitudinal half-section of dish A and flange C, with cover B closed. Fig. 3 is a longitudinal half-section of dish A, showing the raised cover B interlocked with flange C.

The form of dish illustrated shows the flanges C made only at the two ends of dish A; but it is obvious that this interlocking principle can be applied to any desired number of sides without departing from the spirit of my invention.

Having fully described my invention, what I desire to claim and secure by Letters Patent, is—

As a new article of manufacture, a plate or other vessel having a border flange, said flange being provided with a groove, a cover having its edge reversely flanged to fit said groove, whereby when the lid is in a raised position the groove and flange will interlock, substantially as described.

FREDERICK AUGUSTUS OETZMANN.

Witnesses:
JOHN WALLIS DANIEL,
SAMUEL JOHN NARRACOTT.